(12) United States Patent
Son

(10) Patent No.: US 8,169,332 B2
(45) Date of Patent: May 1, 2012

(54) TACTILE DEVICE WITH FORCE SENSITIVE TOUCH INPUT SURFACE

(75) Inventor: Jae Son, Rancho Palos Verdes, CA (US)

(73) Assignee: Pressure Profile Systems Corporation, Los Angeles, CA (US)

( * ) Notice: Subject to any disclaimer, the term of this patent is extended or adjusted under 35 U.S.C. 154(b) by 330 days.

(21) Appl. No.: 12/412,504

(22) Filed: Mar. 27, 2009

(65) Prior Publication Data

US 2009/0243817 A1    Oct. 1, 2009

Related U.S. Application Data

(60) Provisional application No. 61/040,672, filed on Mar. 30, 2008.

(51) Int. Cl.
*G08B 21/00* (2006.01)

(52) U.S. Cl. .................. 340/665; 178/18.01; 341/21

(58) Field of Classification Search .............. 340/665; 178/18.01, 18.06; 341/21, 22, 33, 34; 73/760
See application file for complete search history.

(56) References Cited

U.S. PATENT DOCUMENTS

| | | | |
|---|---|---|---|
| 3,657,475 A | 4/1972 | Peronneau et al. | |
| 4,121,049 A | 10/1978 | Roeber | |
| 4,389,711 A | 6/1983 | Hotta et al. | |
| 4,511,760 A | 4/1985 | Garwin et al. | |
| 4,550,384 A | 10/1985 | Kimura | |
| 4,558,757 A | 12/1985 | Mori et al. | |
| 4,625,075 A | 11/1986 | Jaeger | |
| 4,697,049 A | 9/1987 | Peemoller et al. | |
| 5,038,142 A | 8/1991 | Flowers et al. | |
| 5,241,308 A | 8/1993 | Young | |
| 5,327,164 A | 7/1994 | Fagard et al. | |
| 5,432,671 A | 7/1995 | Allavena | |
| 5,457,289 A | 10/1995 | Huang et al. | |
| 5,488,873 A | 2/1996 | Delmas et al. | |
| 5,510,813 A * | 4/1996 | Makinwa et al. | 345/173 |
| 5,541,372 A | 7/1996 | Baller et al. | |
| 5,543,588 A | 8/1996 | Bisset et al. | |
| 5,854,625 A | 12/1998 | Frisch et al. | |
| 5,889,236 A | 3/1999 | Gillespie et al. | |
| 5,942,733 A | 8/1999 | Allen et al. | |
| 5,943,052 A | 8/1999 | Allen et al. | |
| 6,124,845 A | 9/2000 | Toda et al. | |
| 6,188,391 B1 | 2/2001 | Seely et al. | |

(Continued)

FOREIGN PATENT DOCUMENTS

JP    1993035403    2/1993

(Continued)

OTHER PUBLICATIONS

Korean Intellectual Property Office, International Search Report, Oct. 29, 2009, 4 pages.

(Continued)

*Primary Examiner* — George Bugg
*Assistant Examiner* — Edny Labbees
(74) *Attorney, Agent, or Firm* — George A. Herbster

(57) ABSTRACT

A tactile device includes a touch input surface in any number of forms including a force sensitive touch screen. In this embodiment a cover captures a transparent screen located on capacitive sensors. Touching the screen produces signals from each sensor that can be combined to identify the location of the touch and the force exerted by that touch.

11 Claims, 12 Drawing Sheets

U.S. PATENT DOCUMENTS

| | | | |
|---|---|---|---|
| 6,380,931 B1 | 4/2002 | Gillespie et al. | |
| 6,388,655 B1 | 5/2002 | Leung | |
| 6,414,671 B1 | 7/2002 | Gillespie et al. | |
| 6,481,294 B2 | 11/2002 | Zellner et al. | |
| 6,504,530 B1 | 1/2003 | Wilson et al. | |
| 6,567,102 B2 | 5/2003 | Kung | |
| 6,975,305 B2 | 12/2005 | Yamashita | |
| 7,102,621 B2 | 9/2006 | Roberts | |
| 7,148,882 B2 * | 12/2006 | Kamrath et al. | 345/174 |
| 7,158,122 B2 | 1/2007 | Roberts | |
| 7,176,897 B2 | 2/2007 | Roberts | |
| 7,183,948 B2 | 2/2007 | Roberts | |
| 7,196,694 B2 | 3/2007 | Roberts | |
| 7,254,775 B2 | 8/2007 | Geaghan et al. | |
| 7,784,366 B2 * | 8/2010 | Daverman et al. | 73/862.626 |
| 2002/0163509 A1 | 11/2002 | Robert | |
| 2002/0180710 A1 | 12/2002 | Roberts | |
| 2003/0210235 A1 | 11/2003 | Roberts | |
| 2004/0156168 A1 | 8/2004 | Levasseur et al. | |
| 2006/0092139 A1 | 5/2006 | Sharma | |
| 2006/0181517 A1 | 8/2006 | Zadesky | |
| 2006/0279548 A1 | 12/2006 | Geaghan | |
| 2006/0279553 A1 | 12/2006 | Soss et al. | |
| 2006/0284856 A1 | 12/2006 | Soss | |
| 2006/0293864 A1 | 12/2006 | Soss | |
| 2007/0046639 A1 * | 3/2007 | Swedin | 345/173 |
| 2007/0052690 A1 | 3/2007 | Roberts | |
| 2007/0257821 A1 | 11/2007 | Son et al. | |
| 2008/0180399 A1 * | 7/2008 | Cheng | 345/173 |
| 2009/0160820 A1 * | 6/2009 | Lii et al. | 345/174 |

FOREIGN PATENT DOCUMENTS

JP   1998198507   7/1998

OTHER PUBLICATIONS

Korean Intellectual Property Office, Written Opinion of the International Searching Authority, Oct. 30, 2009, 4 pages.

* cited by examiner

TACTILE DEVICE WITH FORCE SENSITIVE TOUCH INPUT SURFACE

CROSS REFERENCE TO RELATED APPLICATION

This application claims priority from U.S. Provisional Patent Application Ser. No. 61/040,672 filed Mar. 30, 2008.

BACKGROUND OF THE INVENTION

1. Field of the Invention

This invention generally relates to tactile input devices and more specifically to tactile input devices with integral touch input surfaces.

2. Description of Related Art

Tactile input devices are becoming more popular in a variety of applications. Cellular telephones, personal digital assistants (PDAS) and other electronic devices seek to incorporate greater numbers of functions in such devices for a given volume. Tactile input devices can provide this capability. This has led to a number of approaches for providing input devices that utilize capacitive, resistive, strain gauge and other types of sensors.

For example, U.S. Pat. Pub. No. 2007/0257821 to Son et al. (assigned to the same assignee as the present invention) and granted on Oct. 27, 2009 as U.S. Pat. No. 7,609,178 discloses a reconfigurable tactile sensor input device. The input device uses capacitive sensing and includes a first rigid electrode layer, a compressible dielectric structure and a second flexible electrode layer. The dielectric structure may include a matrix of compressible geometric elements with voids therebetween. This approach provides an individual with varying levels of tactile force sensing. An optional flexible display may be mounted over the input device to indicate the present configuration to the individual, which configuration can change from time to time based upon various inputs.

U.S. Pat. Pub. No. 2007/0242037 to Son (assigned to the same assignee as the present invention) and granted Sept. 29, 2009 as U.S. Pat. No. 7,595,788 discloses an electronic device housing with an integrated user input capability. This device measures the force level applied by the individual to a housing for an electronic device. A capacitive sensor is formed between a conductive inside surface of the housing and an electrode on a rigid base. The application of force to the housing deflects a corresponding portion thereby to change the capacitance across the sensor.

In addition to the developments such as those described above, efforts have also been directed to the development of touch location devices, such as touch screens. U.S. Pat. No. 7,148,882 to Kamrath et al. discloses a complex to build capacitor-based force sensors that detect a difference caused by an applied force over a continuous range of applied forces that includes a zero force. A number of these sensors are distributed under an input structure. When a force is applied, the forces as measured by the capacitance properties of each sensor are converted into the position of the applied force on the input structure.

U.S. Pat. No. 7,183,948 to Roberts discloses a tangential force control touch location device that includes force sensor principal elements, lateral softening means and preload springs. A mechanical path, that does not include the force sensors, comprises a plurality of shunt connections that constitute the lateral stiffening means for impeding lateral motion of the touch surface.

Each of the foregoing references discloses different approaches. Manufacturers who wish to incorporate a touch screen with a tactile input device such as shown in the above-identified patent publications purchase the input device from one vendor and the touch screen device from another vendor. Then the manufacturer must determine an approach for integrating the two. Generally the electronics associated with each component are not compatible, so different processing approaches must be undertaken. This may further increase the price and size of the input device to accommodate the different circuits in the device or require more complex signal transfers to external electronic and processing components.

What is needed is a tactile input device that provides a touch screen display in combination with various keyboard configurations whereby the cost of the device is minimized and electronic processing by the device minimizes the communications required with external devices. What is also needed is a universal input solution where one controller IC can handle a touch screen as well as a multi-touch input keypad and specialty buttons such as a pressure sensitive scroll side button.

SUMMARY

Therefore, it is an object of this invention to provide a tactile input device that incorporates an integral touch screen display or other touch input surface.

Another object of this invention is to provide a tactile input device with an integral touch screen display or other touch input surface that minimizes the device costs.

Yet another object of this invention is to provide a tactile input device with an integral touch screen display other touch input surface that simplifies data communication between the device and an external device.

Still yet another object of this invention is to provide a universal touch surface input where one controller IC can handle a touch screen as well as a multi-touch input keypad and specialty buttons such as a pressure sensitive scroll side button.

In accordance with this invention a force-sensitive touch-responsive input device comprises an electronic display and a planar electronic assembly that supports the electronic display and includes a port for visual access to the electronic display. A first cover with a transparent portion and a peripherally extending conductive frame is coincident with and substantially parallel to the electronic display. A second cover has an access port aligned with the first cover and depending edges that form a cavity for receiving the electronic display, the planar electronics assembly and the first cover. A capacitive sensing device is located at each of a plurality of positions about the periphery of the first cover and intermediate the first cover and the planar electronics assembly. Each capacitive sensing device includes a discrete first electrode. The peripheral conductive frame constitutes a second electrode that is common to at least two of the discrete first electrodes. A complaint structure is proximate each discrete first electrode between the planar electronics assembly and the first cover that establishes an initial spacing between the planar electronics assembly and the first cover whereby, during a touch on the first cover, the orientation of the first cover with respect to said planar electronics assembly depends upon the force and location of the touch. A processor that controls the image on the electronic display monitors the capacitance of each capacitive sensing device thereby to determine the force and location of a touch at any location on the first cover whereby the force-sensitive touch-responsive input device is an integral device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
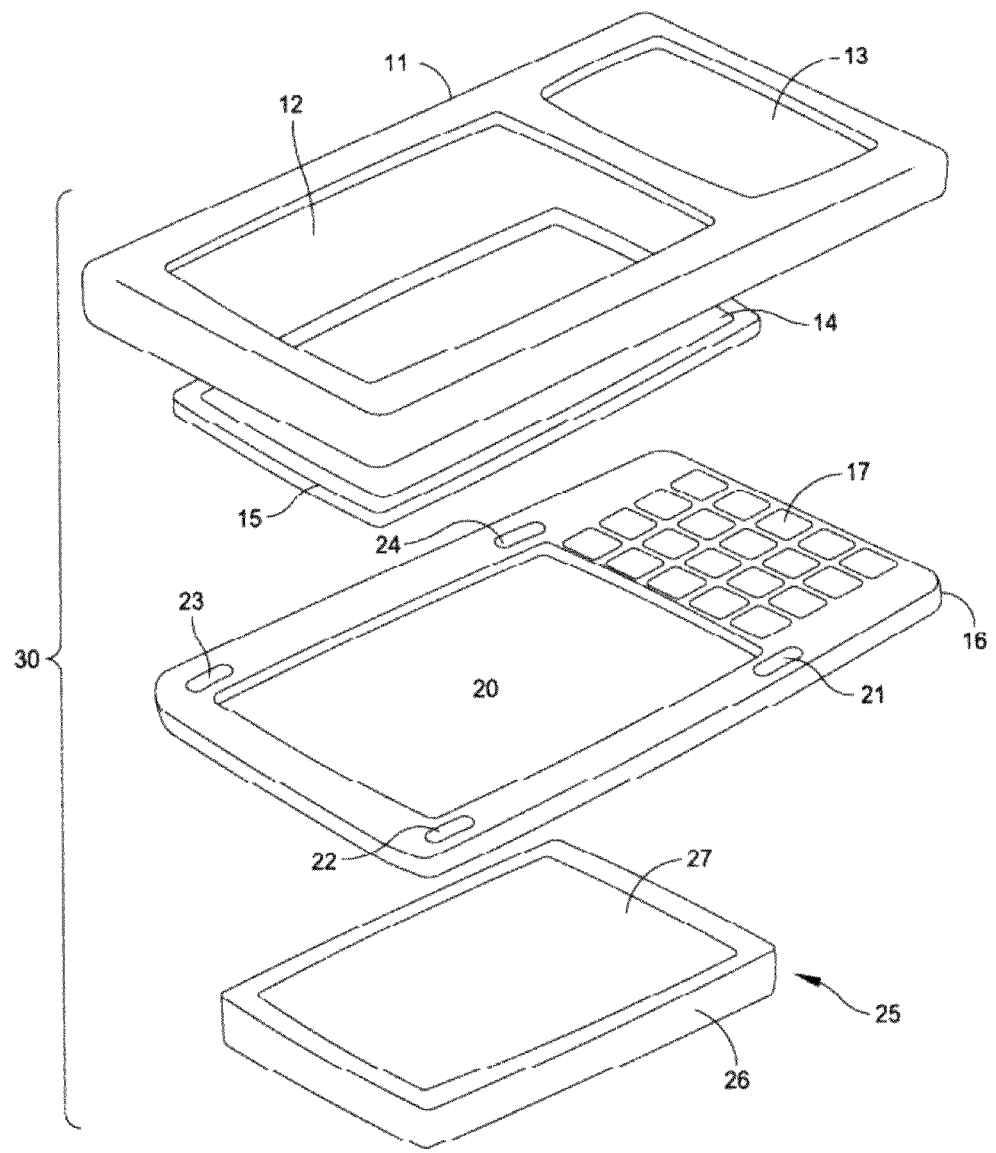
FIG. 1 is an exploded perspective view of a tactile input device with a touch screen embodying this invention.

FIG. 1 depicts the essential elements of a tactile input device 10 that incorporates a touch screen with a reconfigurable tactile input device. The device 10 includes a cover 11 having a generally planar surface and having an access port 12 for a touch screen and an access port 13 for access to input electrodes. The cover also has depending edges about the periphery thereby to form a cavity with an open bottom for receiving and housing other elements of the input device 10.

One such element is a glass cover 14 that nests in the cover 11 below the access port 12 such that the transparent portion is substantially coextensive with the access port 12. The glass cover 14 additionally includes a peripheral conductive frame 15 that lies outside the viewing area afforded by the access port 12. Typically the conductive frame 15 is electrically grounded. Thus an individual can touch the glass cover 14 through the access port. In this embodiment the top surface of the glass cover 14 acts as a touch input surface.

Another element comprises a PC board 16 that includes an array 17 of electrodes that provide a reconfigurable function. In one embodiment these electrodes comprise capacitive sensors. The PC board 16 also includes another port 20 that is essentially coextensive with the glass cover 14.

There are force-sensitive touch-screen sensor electrodes 21 through 24 located on the PC board 16 at the four corners of the port 20. They are positioned to align with the conductive frame 15 of the glass cover 14 when the device 10 is assembled. When assembled, the cover 11 captures the glass cover 14, but the glass cover 14 is supported over electrodes 21 through 24.

The final element of the device 10 is a conventional LCD display 25 that has a peripheral frame 26 and a display area 27. When the device 10 is assembled, an individual has the option of selecting the electrode array 17 or the touch screen formed by the glass cover 14, the electrodes 21 through 24 and the LCD display 25.

When the individual touches the glass cover 14, it deflects in response to the touch force. The conductive frame 15 and the electrodes 21 through 24 constitute capacitive sensors. The change in capacitance of each of the sensors represents a force vector component that depends upon the location and magnitude of the individual's touch of the glass cover 14. Consequently the signals from each of the electrodes 21 through 24 can be processed to determine the magnitude and/or location of the touch. As will be apparent, this information will be transferred to the external device driving the LCD display 26 in accordance with any of a variety of function.

Thus, in accordance with the objects of this invention, the device 10 is a tactile input device that incorporates an integral touch screen display. The device 10 is characterized by a minimal volume suitable for mobile and small electronics and by minimal cost. Further, the device 10 simplifies data communication between the device 10 and an external device.

Figure 2:
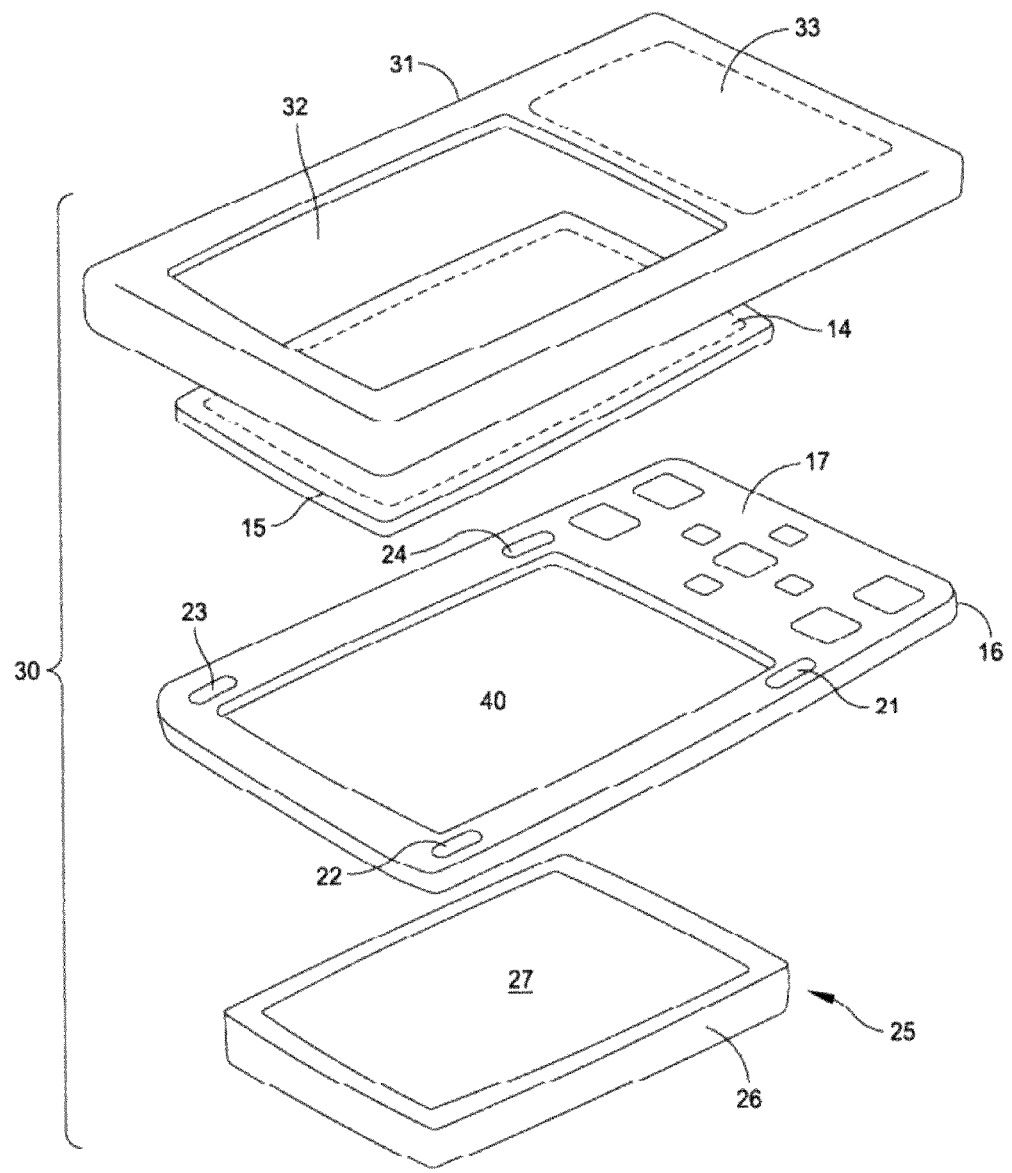
FIG. 2 is an exploded perspective view of another tactile input device with a touch screen embodying this invention.

FIG. 2 depicts the essential elements of another tactile input device 30 that incorporates a touch screen with an input device having a deflectable housing. In the following discussion, like numbers designate elements in FIG. 2 that can have the same construction as in the device 10 in FIG. 1. The device 30 includes a cover 31 with a generally planar surface with an access port 32 for a touch screen. An area 33 constitutes an area in which an individual touches marked areas and deflects a corresponding portion of the area 33 thereby to produce a change in capacitance between the selected area 33 and input electrodes 37. The cover 31 also has depending edges about the periphery thereby to form a cavity with an open bottom for receiving and housing other elements of the input device 30.

Like the input device 10 in FIG. 1, the glass cover 14 nests in the cover 31 below the access port 32 such that the transparent portion is substantially coextensive with the access port 32. Moreover, the glass cover 14 includes the peripheral grounded conductive frame 15 that lies outside the viewing area afforded by the access port 32 so an individual can touch the glass cover 14 through the access port 32.

In this embodiment a PC board 36 includes an array 37 of electrodes that interact with the cover area 33 to enable the device 30 to utilize the cover 31 as an input. The PC board 36 also includes another port 40 that is essentially coextensive with the glass cover 14.

Like the input device 10 in FIG. 1, force-sensitive touch-screen sensor electrodes 21 through 24 are located on the PC board 36 proximate the four corners of the port 40. They are positioned to align with the conductive frame 15 of the cover 14 when the device 30 is assembled. When assembled, the cover 31 captures the cover 14, but the cover 14 is supported on the electrodes 21 through 24.

The LCD display 25 with its frame 26 and display area 27 constitute the final element of the device 30. Thus when the device 30 is assembled, a individual has the option of selecting the area 37 or the touch screen formed by the cover 14, the electrodes 21 through 24 and the LCD display 25. As will be apparent, the device 30 also is a tactile input device that incorporates an integral touch screen display and that meets the various objects of this invention.

Figure 3A:
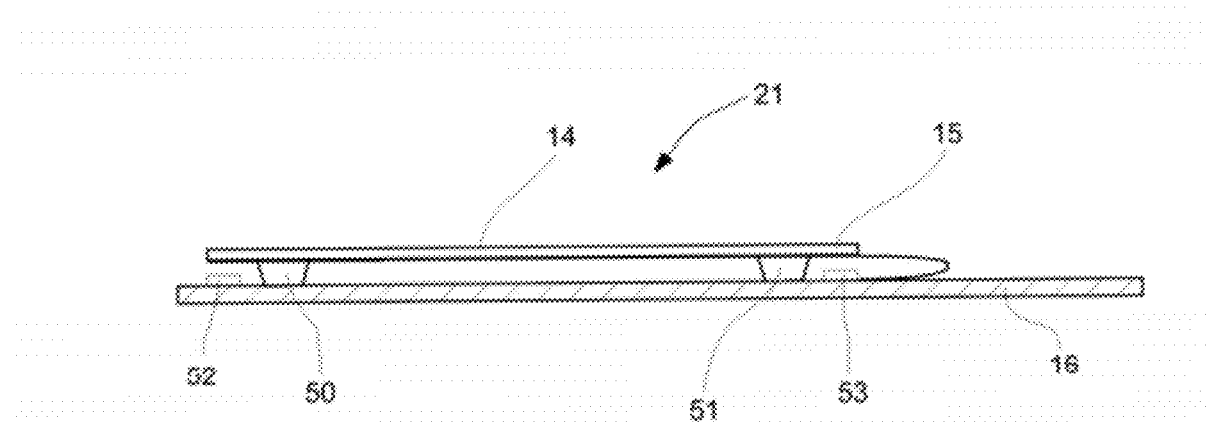
FIGS. 3A through 3C are cross sectional views of one embodiment of a capacitive sensor useful in implementing this invention.
Figure 3B:
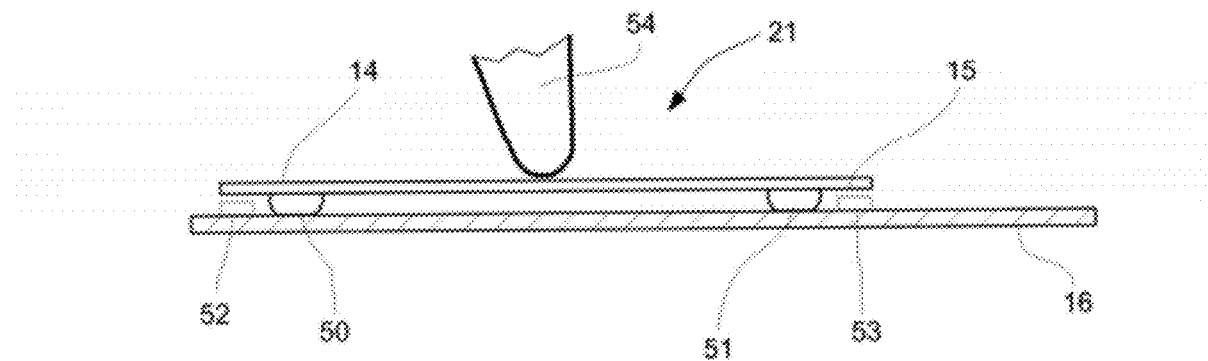
Figure 3C:
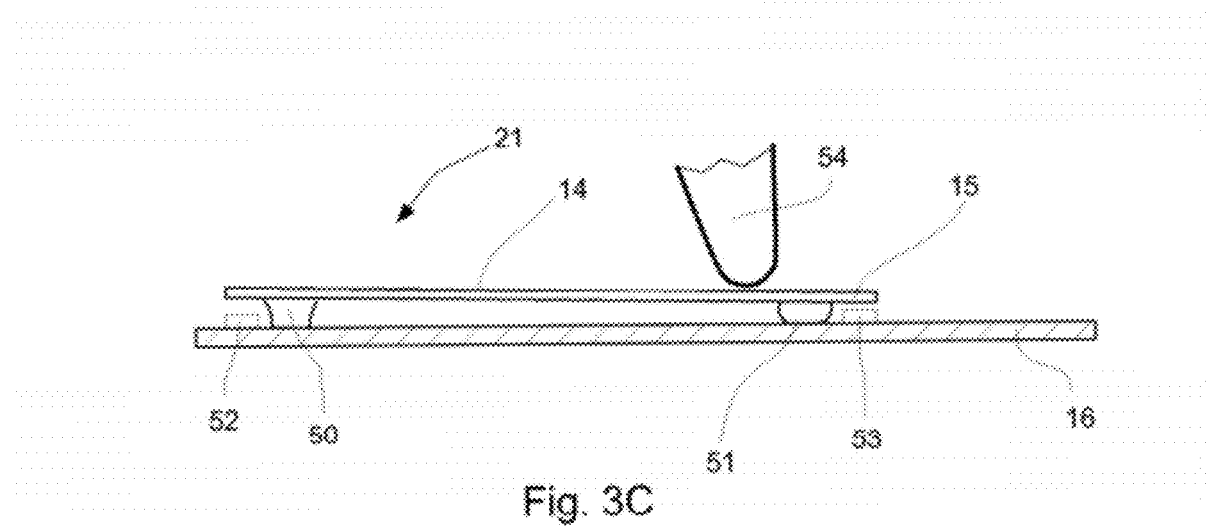

In most embodiments, each of the capacitive sensors produced by the conductive frame 15 and the electrodes 21 through 24 will have the same construction. FIGS. 3A through 3C depict a typical construction for sensors, such as sensor 21. Referring to FIG. 3A, spaced compliant support structures 50 and 51 are interposed between the glass cover 14 and the PC board 16 proximate the periphery of the glass cover 14. These support structures 50 and 51 carry the cover 14 with portions of the grounded conductive frame 15 aligned with and spaced above electrodes 52 and 53 on the PC board 16.

The support structures 50 and 51 can be formed of a number of complaint insulating materials. Silicone, rubber and polyurethane are examples of acceptable materials.

As previously indicated, when an individual touches the cover 14, it deflects by an amount dependent upon the magnitude and location of the force on the glass cover 14 with the deflection at each of the sensors 21 through 24 varying depending upon the location and magnitude of the applied force. FIG. 3B depicts the application of a force by a stylus 54 or finger that produces a force intermediate the support structures 50 and 51 whereby they compress equally. As a result, the portions of the conductive frame 15 that are coextensive with the electrodes 52 and 53 move downward thereby decreasing the inter-electrode spacing equally and increasing the capacitance of each sensor equally.

As shown in FIG. 3C, if the stylus 54 depresses the cover 14 near the support structure 51, it compresses more than the support structure 50. As shown in FIG. 3C, the support structure increases the inter-electrode spacing between the conductive frame 15 and the electrode 52 while the inter-electrode spacing between the conductive frame 15 and the electrode 53 decreases. As a result the capacitance of the sensor including the electrode 52 decreases while the capacitance of the sensor including the electrode 53 increases. Collectively, these signals indicate that the force has been applied closer to the right in FIG. 3C.

Figure 4A:
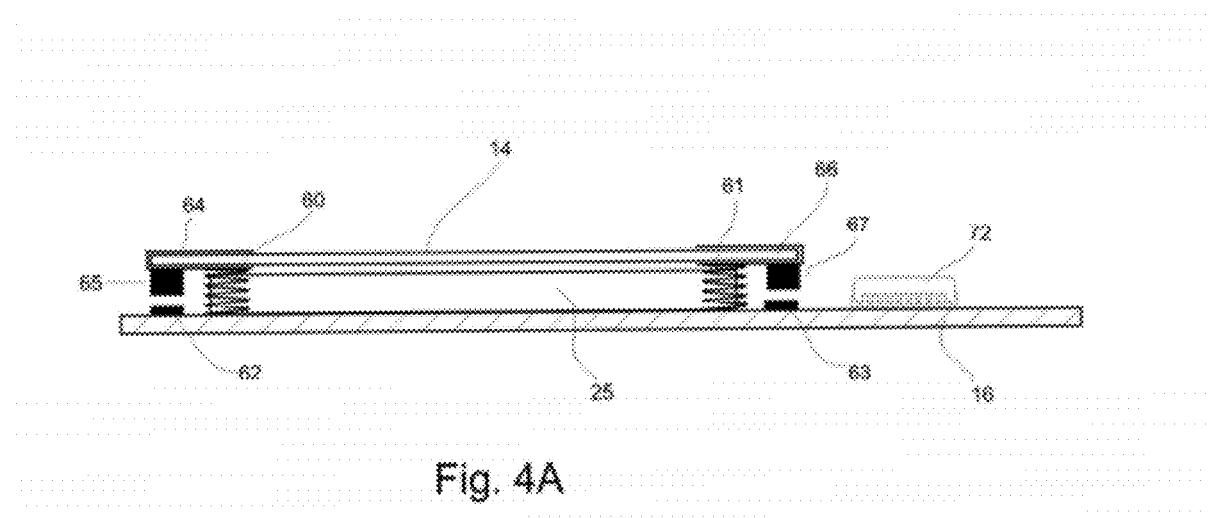
FIGS. 4A and 4B are cross sectional views of variants of another embodiment of a capacitive sensor useful in implementing this invention.

In FIG. 4A the support structures comprise springs 61 and 62 for spacing the cover 14 above the LCD 25. The PC board 16 supports electrodes 62 and 63 at locations that align with the edges of the cover 14. In this embodiment, an electrically grounded structure 64 carries an electrode 65; a similar structure 66 carries an electrode 67. The operation is essentially the same as described with respect to FIGS. 3A through 3C. This construction is particularly advantageous in providing linear force deflection response. Whereas in the embodiments of FIGS. 1 and 2 the peripheral conductive frame will generally be constituted by a metal coating, in FIG. 4A the coating is replaced by the metal clip 64 that can simplify assembly.

Figure 4B:
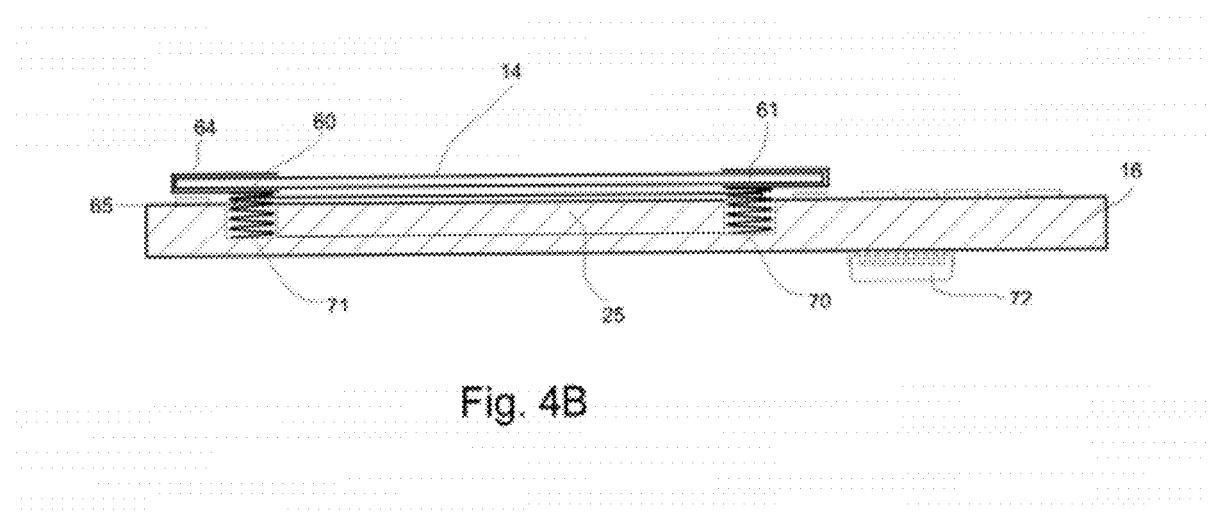

FIG. 4B depicts a variation of the structure in FIG. 4A wherein the PC board or rigid substrate 16 is thick and formed with a recess for the LCD display 25. In this case, the PC board or rigid substrate 16 is also modified to incorporate wells, such as wells 70 and 71 that receive the springs 60 and 61. In this variation, the grounded peripheral conductive clip 64, for example, serves as the electrode.

Each of FIGS. 4A and 4B depict a PC board 16 with a processor 72. Adding such a processor enables processing of the information from both the FST Screen and the RTID and/or HAI sensors to produce the position and magnitude of the applied force independently of any external device. As will be apparent, such a feature allows communications with external devices to be by high-level commands thereby reducing the bandwidth requirements for any communications link between the tactile input device and the external device.

Figure 5A:
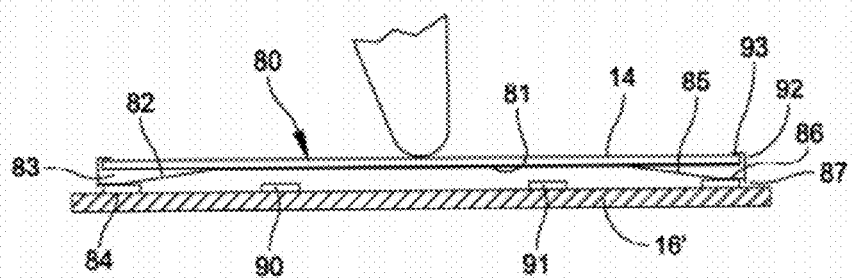
FIGS. 5A through 5C are cross sectional views of variants of yet another embodiment of a capacitive sensor useful in implementing this invention.
Figure 5B:
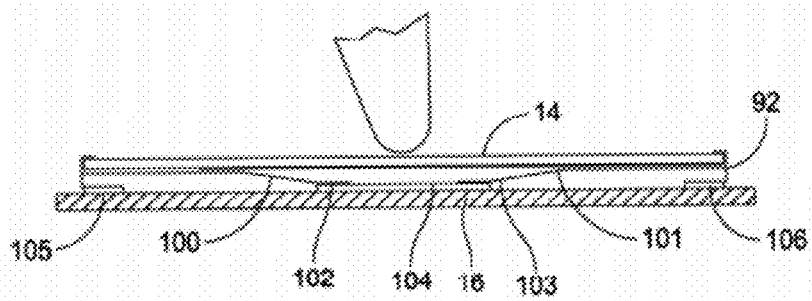
Figure 5C:
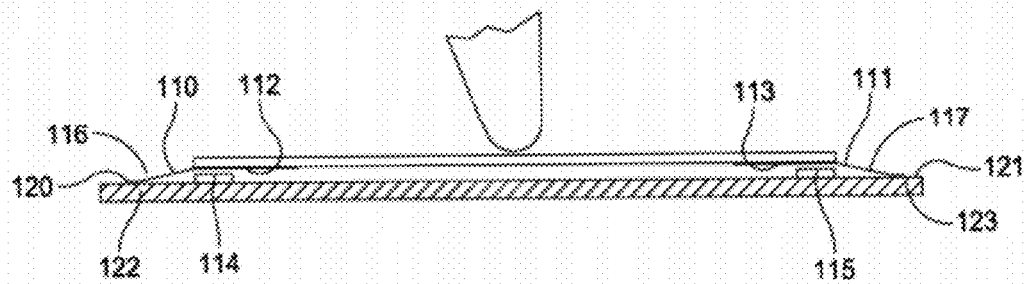

Whereas FIGS. 4A and 4B disclose springs 60 and 61 to provide a restoring force, FIGS. 5A through 5C depict other variations that incorporate leaf springs. In FIG. 5A, a force is applied to the cover 14 that is spaced above the PC board 16. A leaf spring 80 includes a center portion 81 that bears against the cover 14. A first offset wing 82 includes a pad 83 that attaches to a ground electrode 84. A second offset wing 85 includes a pad 86 that attaches to another ground electrode 87. Sections of the central portion 81 above electrodes 90 and 91 complete the sensor. In this specific embodiment, a peripheral channel 92 attaches to the PC board 16 to provide some degree of rigidity. A flange 93 overlies the cover 14 to limit the upward movement thereof.

FIG. 5B depicts a variant in which a pair of leaf springs 100 and 101 have first grounded portions that clip to the edges of the cover 14. Offset portions 102 and 103 engage a ground contact 104. The leaf springs 100 and 101 bias the cover away from the PC board 16. A channel 92 defines the maximum spacing. Portions of the springs 100 and 101 that are essentially coextensive with sensor electrodes 105 and 106 complete the sensor.

In FIGS. 5A and 5B the leaf springs are intermediate the cover 14 and the PC board 16. FIG. 5C depicts a sensor in which leaf springs 110 and 111 have first portions 112 and 113 that abut the cover 14 and overlie sensor electrodes 114 and 115. Portions 116 and 117 provide offset pads 120 and 121 that attach to ground electrodes 122 and 123, respectively. Thus FIG. 5C depicts a sensor that includes two spaced capacitive sensing elements.

Each of FIGS. 3A through 3C, 4A, 4B and 5A through 5C depict two capacitive sensors. As will now be apparent, an FST (Force Sensitive Tactile) screen will require two such structures on opposite ends or sides of the cover 14 thereby to provide the four sensor points at the positions 21 through 24 in each of FIGS. 1 and 2.

It is, of course, necessary to calibrate such a system so that the location derived from the sensor signals is accurate. For purposes of understanding one such calibration process, it is assumed that the sensors 21 through 24 be designated bottom left (BL), top left (TL), top right (TR) and bottom right (BR).

Figure 6:
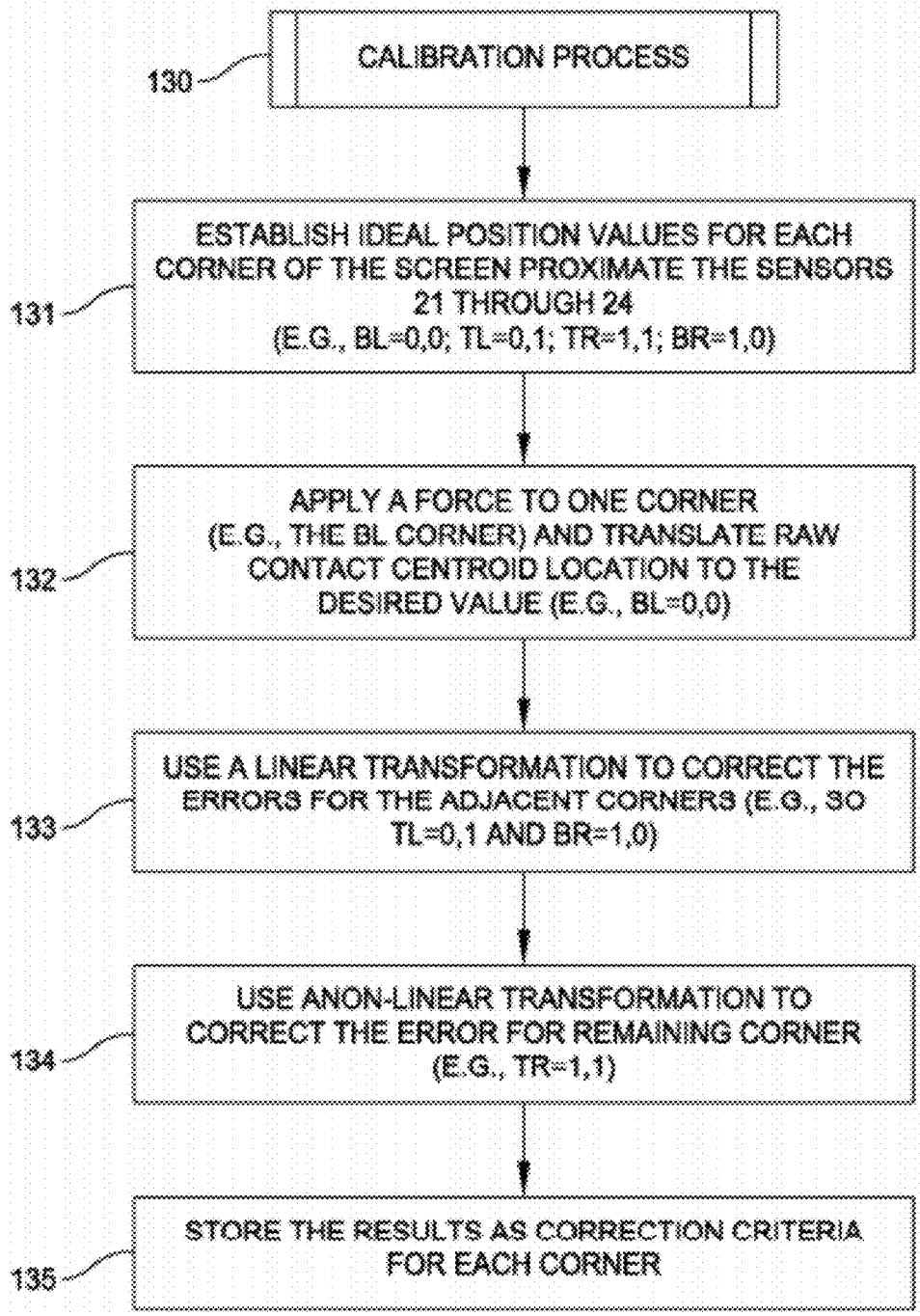
FIG. 6 is a flowchart of one example of a calibration process.

As shown in FIG. 6, a calibration process 130 begins when step 131 establishes an ideal position value for each corner of the screen. Using unit values, the ideal position value for the BL corner is 0,0; for the TL corner, 0,1; for the TR corner, 1,1; and for the BR corner, 1,0.

After a force is applied at corner 0,0, step 132 translates the raw contact centroid location to the desired 0,0. For example, the if the BL corner is pressed, the resulting Centroid value is set to 0,0. Step 133 implements a linear transformation to generate a correction criterion for the two adjacent sensors. That is, the TL and BR corners in this example. Step 134 implements a non-linear transformation to generate a correction criterion for the remaining, diagonally opposite location; that is, the TR corner in this example.

Once these measurements and transformations of steps 132 through 134 have been completed, step 135 can store the correction criteria in a processor, such as the on-board processor 72 in FIGS. 4A and 4B. Thereafter, these criteria are used to correct any variations in the sensor readings.

As will now be appreciated, the various embodiments associated with the specific embodiments of FIGS. 3A through 5C depict a variety of tactile input devices that incorporate a force sensitive touch screen as another input. The force sensitive touch screen can also be applied without the display screen to form a rigid input device. In addition, a variety of capacitive sensor structures have been disclosed that can implement this invention and may be tailored to particular applications.

It has also been found that the invention shown in the foregoing figures has other applications, such as tablet input devices and as multi-touch input devices. Tablet input device embodiments can be adapted to record any motion of the translation of an input force as applied, for example, through a stylus to record written or graphic images. Multi-touch input devices provide the capability of discriminating the locations of multiple simultaneous applications of force to an input device as by simultaneous touching by two or more of an individual's fingers.

Figure 7:
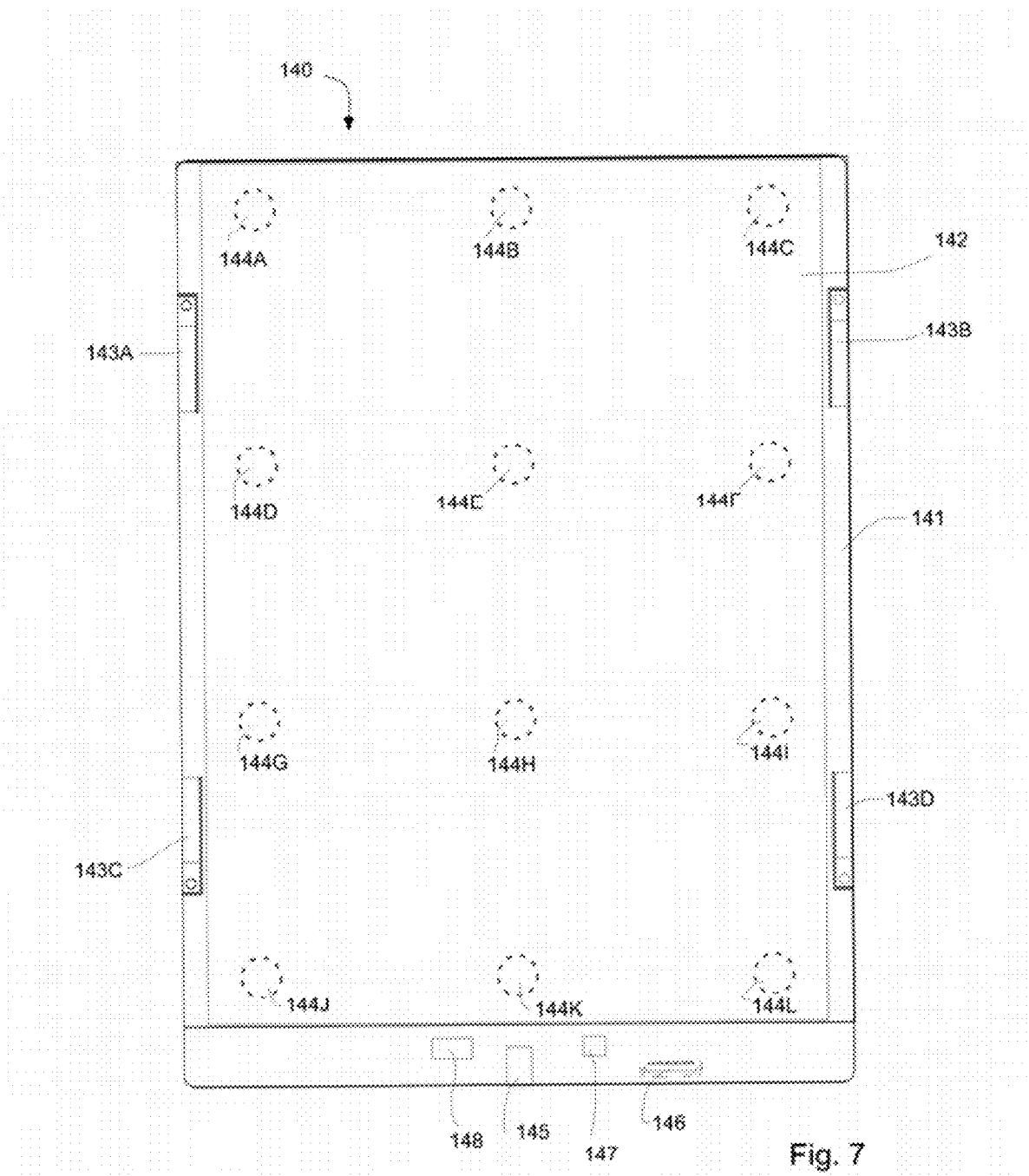
FIG. 7 is a plan view of another tactile input device embodying this invention.

FIG. 7 depicts an input and display device 140 that utilizes this invention to enable an individual to "write" on the device and display the "writing." FIG. 7 provides a top plan view of the device 140 that shows an underlying PC board 141 for defining a reference plane and a glass cover 142 for acting as an input means on which an individual can use a stylus or other implement to "write." Flexures 143A through 143D provide the necessary flexure to allow the process of "writing" to produce a change in the spacing between the PC board 141 and the glass cover 143.

As also shown in FIG. 7, the device 140 defines an array of sensor locations. In this particular embodiment, twelve locations define a 3×4 array of sensor locations 144A through 144L. As described in greater detail with respect to FIGS. 8 through 10, each location is characterized by electrodes that define a capacitor such that any change in the spacing between the PC board 141 and the glass cover 142 produces a corresponding change in the capacitance value.

A power connection 145 and a data connection 146 provide power to the system and retrieve the signals from which a signal processor, such as an appropriately programmed digital computer, can identify both the location and the force produced by the touch of the glass cover 142 through a capacitance sensing IC 147. There are many algorithms that can be adapted for providing this output. With one such algorithm variations in the capacitance provide centroid values for each location and the individual centroid values then can be combined to provide a resultant signal that identifies the x-y position of the force being applied and the magnitude of that force. A gravity sensing accelerometer 148 can compensate for the weight of the input structure 142 as the device is tilted relative to a gravity vector. The accelerometer 148 can also be used to compensate, filter or ignore the force sensing elements when the device is under severe vibration during transportation.

Figure 8:
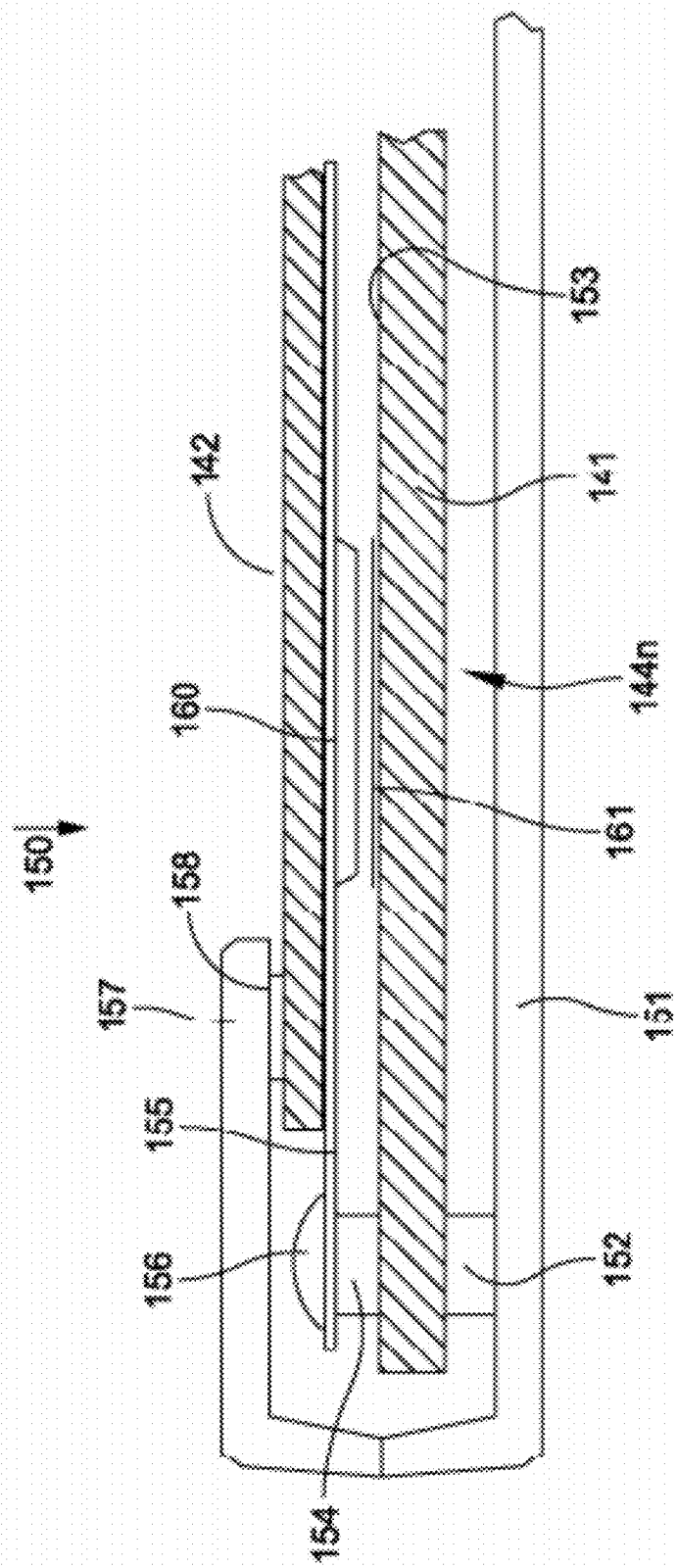
FIG. 8 is a partial cross sectional view of first implementation of the tactile input device of FIG. 7.

FIG. 8 depicts one portion of a specific embodiment of a device that can provide the functions described above with reference to FIG. 7. This embodiment 150 includes an enclosure base 151 that includes a plurality of standoffs, such as standoff 152, to support a PC board 141. The PC board 141 defines a reference surface 153. Another spacer 154 positions an extension of an electric shield 155 beyond the periphery of the glass cover 142 to which it attaches. A fastener, such as a screw 156, completes the support structure. An L-shaped peripheral enclosure cover 157 overlies and protects this structure and a complaint or soft seal 158 provides an upper motion limit and a barrier to the infiltration of debris into the interior of the device 150.

FIG. 8 and other figures depict the cover 142 as a single element. However, in many implementations of this invention the cover 142 will include an integral display, such as an electric paper (ePaper) display between a protective glass cover and an electric shield. Therefore, references in the following discussion to a "glass cover" are intended to include such a cover or the combination of a cover and a display.

FIG. 8 also depicts one sensor location 144n. At this location a first electrode 160 is formed on the electric shield 155 and is spaced above a second electrode 161 formed on the reference surface 153. In this embodiment the first electrode moves with the glass cover 142 while the second electrode 161 remains stationary. The electrodes 160 and 161 can be formed as discrete elements with individual conductors to a common connection. Alternatively, the electrodes 160 can be constructed of spaced parallel strips aligned with one of array columns and rows while the electrodes 161 are constructed of spaced parallel strips aligned with the other of the array columns and rows. This approach can simplify and reduce the number of interconnections between the electrodes and a signal processor while providing high resolution pressure map which is useful in conjunction with a flexible display that allows more than two point multi-touch sensing capability.

From the foregoing, it will be apparent that if an individual presses on the glass cover 142, it will deflect with an orientation dependent upon the location at which the glass cover 142 is depressed. Unless a force is applied at the exact center of the glass cover 142, the spacing between electrodes at different sensor positions will differ so the signals from each sensor location will also differ. In some situations the spacing or gap between electrodes at some sensor locations will decrease in response to a touch; the gaps at other locations may increase; still other gaps may remain essentially unchanged. Collectively, however, the sensors will provide sufficient information to determine the location of the force.

Figure 9:
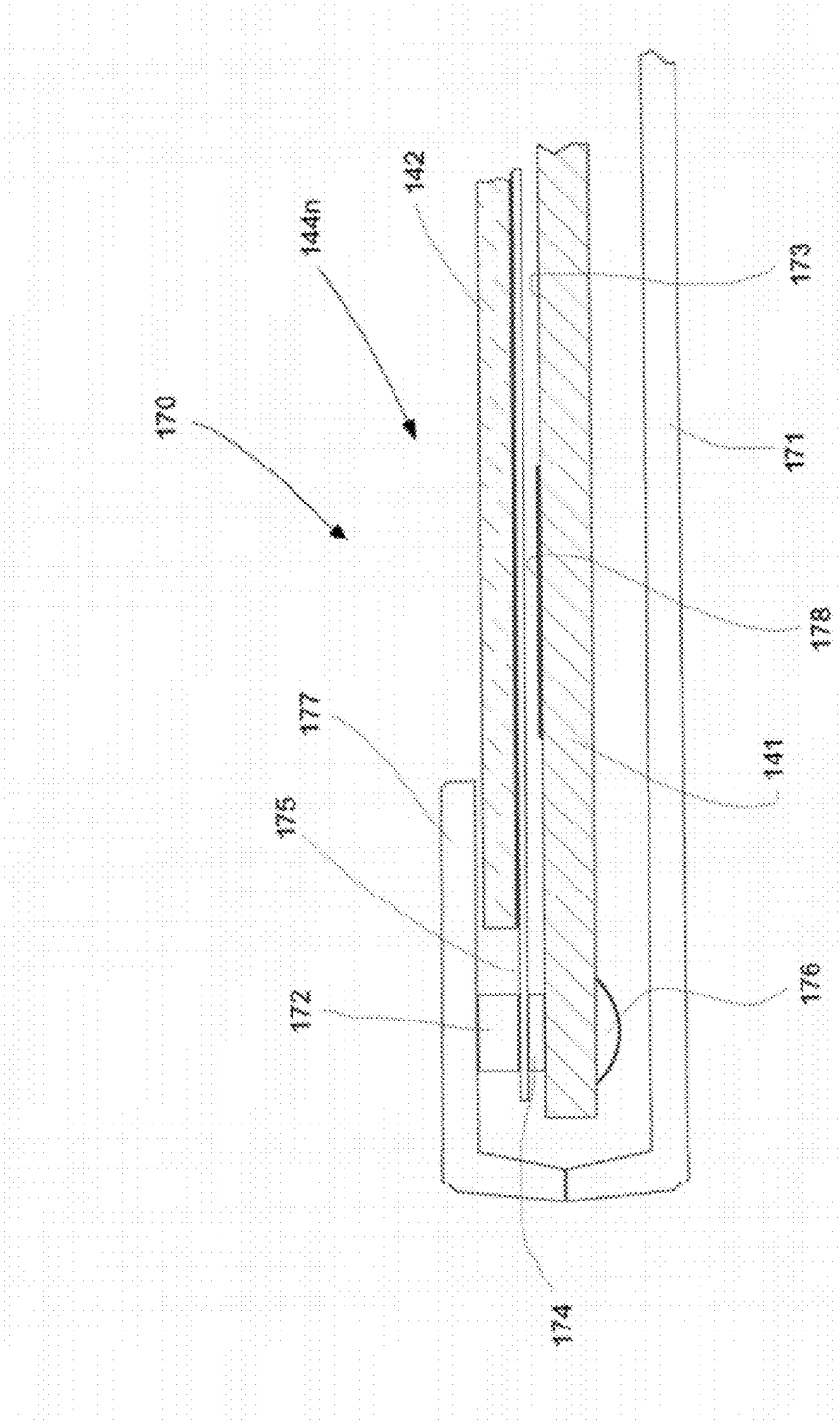
FIG. 9 is a partial cross sectional view of a second implementation of the tactile input device of FIG. 7.

FIG. 9 depicts one portion of a second embodiment of a device that can provide the functions described above with reference to FIG. 7. This embodiment 170 includes an enclosure base 171 with a plurality of standoffs, such as standoff 172, for supporting a PC board 141. The PC board 141 defines a reference surface 173. Another spacer 174 positions an extension of an electric shield 175 beyond the periphery of the glass cover 142 to which it attaches. A fastener, such as a screw 176, completes the support structure. An L-shaped peripheral enclosure cover 177 overlies and protects this structure.

FIG. 9 also depicts one sensor location 144n. At this location a first electrode is formed by the electric shield 175 as a solid and continuous ground plate. It is spaced above a second electrode 178 formed on the reference surface 173. In this embodiment the first electrode acts as a ground electrode and moves with the glass cover 142 while the second electrode 178 remains stationary. The electrodes 178 are formed as discrete elements with individual conductors, as formed by a rigid or flexible printed circuit board or a conductive ink printed on a plastic film. In whatever form, they connect to a capacitance sensing IC 147 or like component or circuit.

From the foregoing, the glass cover 142 it will deflect when a force is applied thereby changing the relationship of the ground plane with the individual second electrodes 178. Again, collectively the signals provide sufficient information to determine the location of the force of the glass plate.

Figure 10:
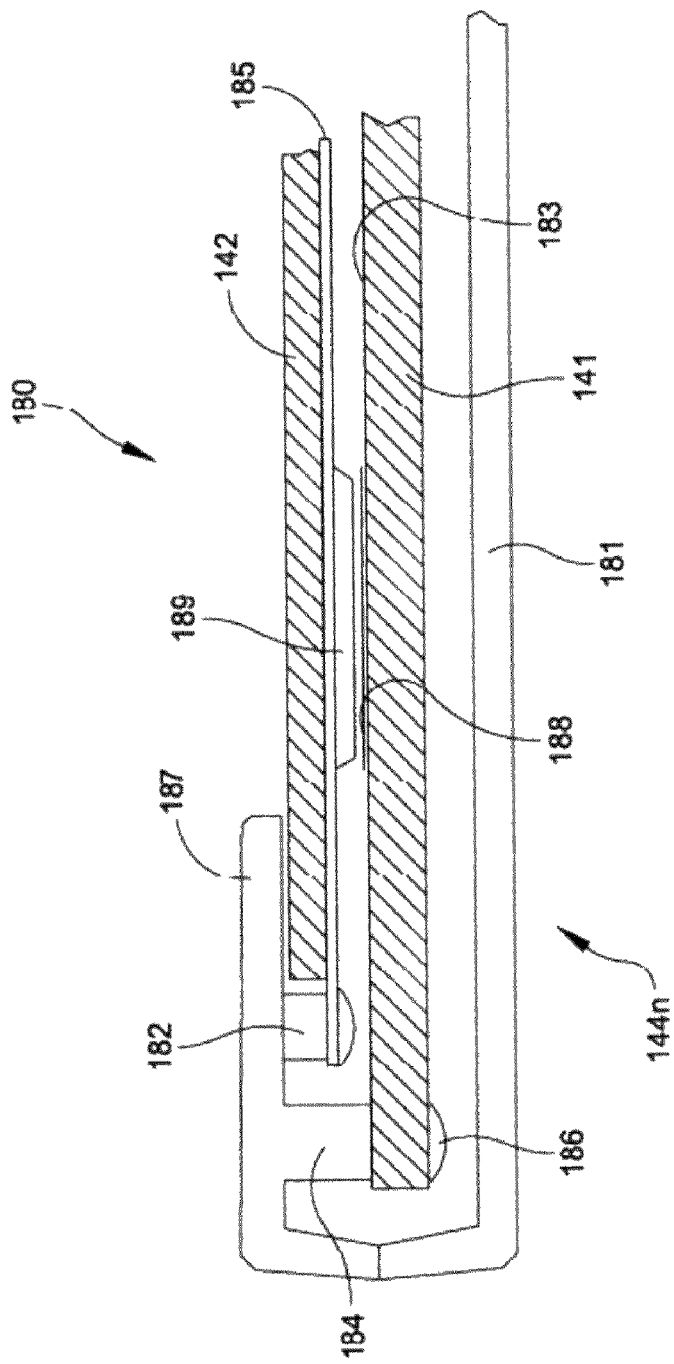
FIG. 10 is a partial cross sectional view of a third implementation of the tactile input device of FIG. 7.

FIG. 10 depicts one portion of a third embodiment of a device that can provide the functions described above with reference to FIG. 7. This embodiment 180 includes an enclosure base 181 for supporting the PC board 141 and the glass cover 142 which includes an electric shield 185 and an L-shaped peripheral enclosure cover 187. In this embodiment, standoffs and screws, such as shown at 182, depend from the cover 187 to support the electric shield 185 with the glass cover 142 and provide the necessary flexure. Other standoffs, such as a spacer 184, also depend from the cover 187 to position the PC board 141 with the reference surface 183.

In this embodiment the structure of the sensor at sensor location 144n includes a first electrode 189 that is formed on the electric shield 185. This construction enables better control of electrode spacing by using a structural frame 187. In this configuration, the electric shield 185 and the electrodes 189 form discrete ground electrodes spaced above second electrodes, such as the electrode 188, formed on the reference surface 183. The electrodes 188 are formed as discrete elements with individual conductors to a common connection.

From the foregoing, the glass cover 142 it will deflect when a force is applied thereby changing the relationship of the ground plane with the individual second electrodes 188. Again, collectively the signals provide sufficient information to determine the location of the force of the glass plate.

Figure 11:
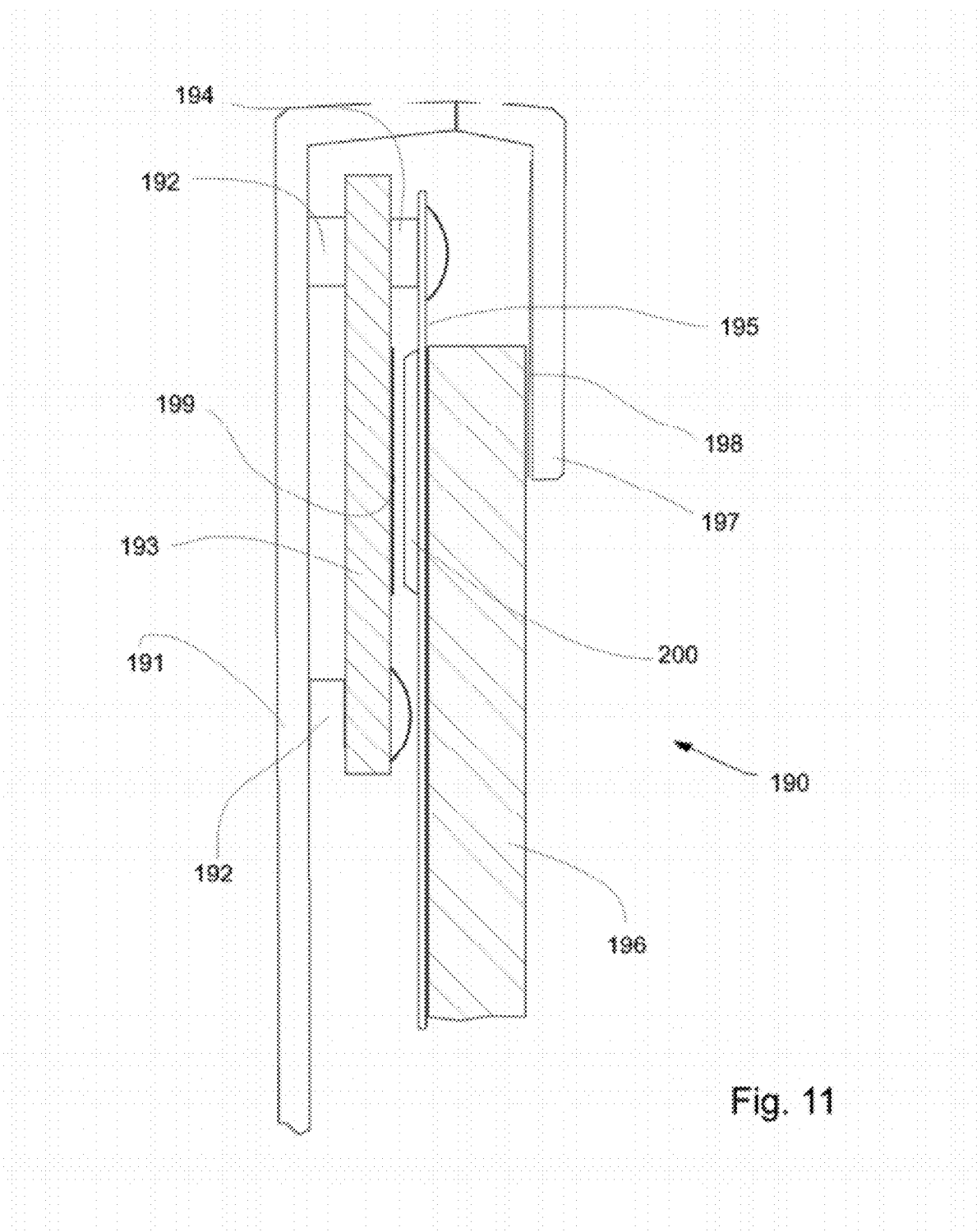
FIG. 11 is a partial cross sectional view of a first embodiment of yet another tactile input device embodying this invention.

FIG. 11 depicts one portion of another embodiment of a device that can provide the functions described above with reference to FIG. 7. This embodiment 190 includes an enclosure base 191 for supporting an LCD display unit 196, rather than a ePaper display. The LCD includes an electric shield frame 195 and an L-shaped peripheral enclosure cover 197. In this embodiment, standoffs and screws, such as the standoffs 192 and 194, are screwed together and extend from the base 191 to support the electric shield 195 and provide the necessary flexure for the LCD display 196.

In this embodiment the structure of the sensor includes a first electrode 200 that is formed by the LCD sheet metal and a second electrode 199 on a small PC board 193 that is mounted to the base 191 and supporting the flexure 195 of the LCD frame 196. In this arrangement, the LCD could be mounted facing in opposite direction such that the applied force on the LCD surface expands the gap between 199 and 200 rather than compressing it.

Figure 12:
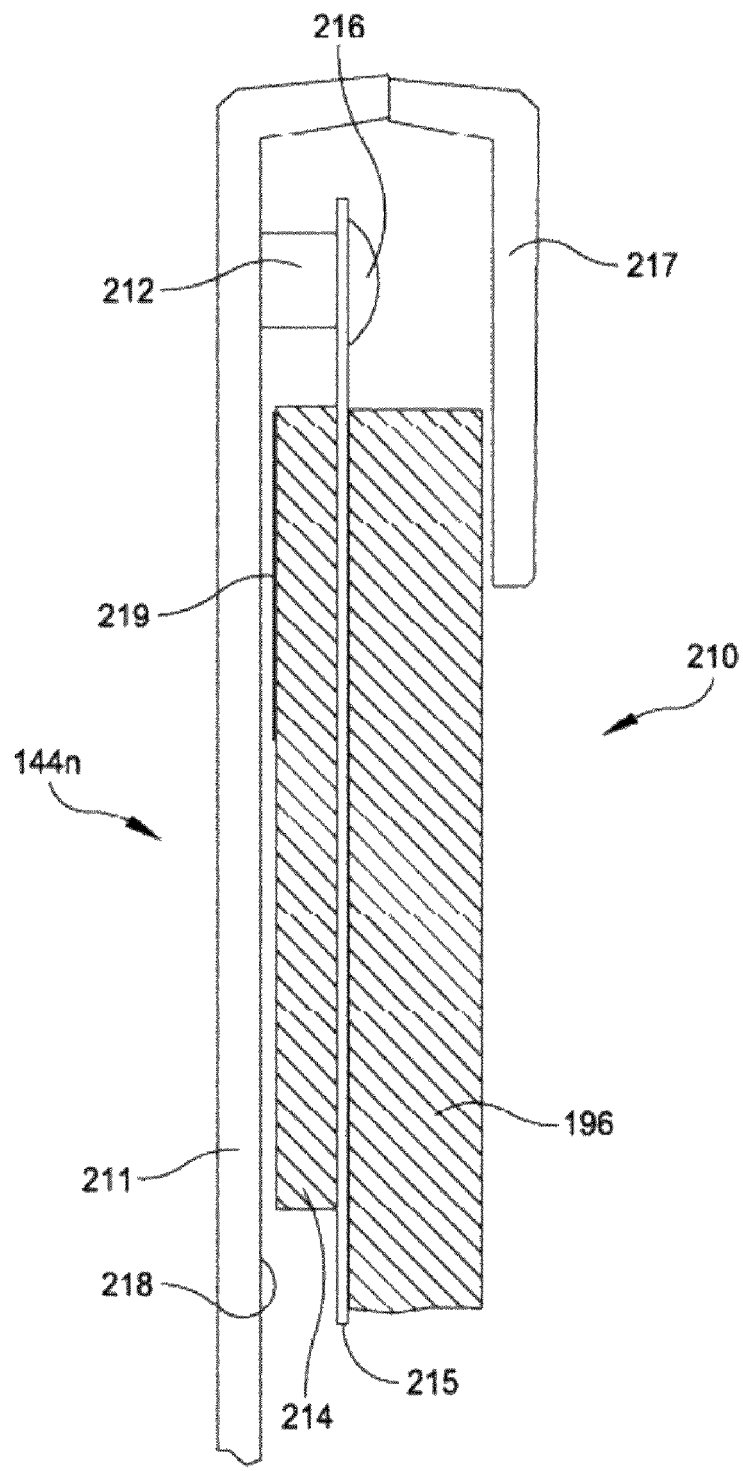
FIG. 12 is a partial cross sectional view of a second embodiment of the tactile input device of FIG. 11.

FIG. 12 depicts one portion of another embodiment of a device that can provide the functions described above with reference to FIG. 7. This embodiment 210 includes an enclosure base 211 for supporting an LCD display unit 196, rather than a ePaper display. The LCD includes an electric shield frame 215 and an L-shaped peripheral enclosure cover 217. In this embodiment, standoffs and screws, such as the standoff 212 and screw 216, extend from the base 211 to support the electric shield 215 and provide the necessary flexure for the LCD display 196.

In this embodiment the structure of the sensor at sensor location 144n includes a first electrode 219 that is formed on the bottom of the PC board 214 and spaced from the enclosure 211. The base 211 has a metallized upper surface 218 that acts as the second, or ground electrode, for each sensor location. In this configuration, metallized surface 218 is a continuous ground electrode underlying the entirety of the LCD display while the electrodes 219 form discrete electrodes spaced above metallized upper surface.

FIG. 8 depicts a barrier 158. In this embodiment of FIG. 11, a thin-film dust seal 198 is located between the end of the enclosure cover 197 and the LCD device 196. Such a seal can be affixed by an adhesive to the corresponding surfaces of the enclosure cover 197 and the LCD 196. This provides a positive barrier for preventing the accumulation of debris in the internal portions of the device without restricting or biasing the motion of the LCD display 196.

From the foregoing, the LCD display 196 will deflect when a force is applied thereby changing the relationship of the ground plane 218 with the individual second electrodes 219. Again, collectively the signals provide sufficient information to determine the location of the force of the glass plate.

In summary, there has been disclosed a number of illustrative embodiments for a tactile device with force-sensitive touch screens formed by rigid transparent layers mounted over LCD display devices or ePaper display devices. As previously indicated, in some applications the touch screen may be deformable so that it is possible to record and display multiple touches to different parts of the touch screen. While ePaper and LCD displays have been specifically disclosed, other display devices, such as an organic light emitting diode display, can be substituted. Different configurations of the components for providing the touch and reference surfaces and the flexure function can be substituted for any of the specifically disclosed embodiments. Different capacitive sensor configurations can be adapted for use with this invention.

Embodiments of this invention can provide additional benefits by eliminating the use of transparent conductive materials, such as ITO, above a display that can degrade the quality of the display. ITO is a limited resource and is not ecologically friendly. For a touch screen application, such as an e-book, eliminating an ITO layer provides a significant benefit by eliminating this degradation.

This invention has been disclosed in terms of certain embodiments. It will be apparent that many modifications can be made to the disclosed apparatus without departing from the invention. Therefore, it is the intent of this invention to cover all such variations and modifications as come within the true spirit and scope of this invention.

What is new and claims is:

1. An integral force-sensitive touch-responsive input device comprising:
    A) an electronic display,
    B) a planar electronic assembly that supports said electronic display and includes a port for visual access to said electronic display,
    C) a first cover having a transparent portion and a peripherally extending conductive frame coincident with and substantially parallel to said electronic display,
    D) a second cover having an access port aligned with said first cover and depending edges that form a cavity for receiving said electronic display, said planar electronics assembly and said first cover,
    E) a capacitive sensing device at each of a plurality of positions about the periphery of said first cover and intermediate said first cover and said planar electronics assembly, each of said capacitive sensing devices including a discrete first electrode at each capacitive device position, said peripheral conductive frame constituting a second electrode that is common to at least two of said discrete first electrodes,
    F) a complaint structure proximate each discrete first electrode between said planar electronics assembly and said first cover that establish an initial spacing between said planar electronics assembly and said first cover whereby, during a touch on said first cover, the orientation of said first cover with respect to said planar electronics assembly depends upon the force and location of the touch, and
    G) a processor that controls the image on said electronic display and monitors the capacitance of each capacitive sensing device thereby to determine the force and location of a touch at any location on the first cover whereby said force-sensitive touch-responsive input device is an integral device.

2. The force-sensitive touch-responsive input device as recited in claim 1 wherein said first cover comprises a rigid glass plate supported by said plurality of compliant structures.

3. The force-sensitive touch-responsive input device as recited in claim 2 wherein each of said compliant structures comprises at least one molded silicone structure.

4. The force-sensitive touch-responsive input device as recited in claim 2 wherein each of said compliant structures comprises at least one compression spring.

5. The force-sensitive touch-responsive input device as recited in claim 2 wherein each of said compliant structures comprises at last one leaf spring.

6. The force-sensitive touch-responsive input device as recited in claim 2 wherein said plurality of complaint structures flexure is four.

7. The force-sensitive touch-responsive input device as recited in claim 6 wherein said first cover includes a deformable portion and said processor generates signals representing the force and location of multiple touches of said first cover.

8. The force-sensitive touch-responsive input device as recited in claim 1 wherein said planar electronic assembly comprises a printed circuit board.

9. The force-sensitive touch-responsive input device as recited in claim 1 wherein said electronic display is an LCD display.

10. The force-sensitive touch-responsive input device as recited in claim 1 wherein said electronic display is an e-paper display.

11. The force-sensitive touch-responsive input device as recited in claim 1 wherein said electronic display is an LED display.

* * * * *